(12) United States Patent
Tan

(10) Patent No.: US 10,150,386 B2
(45) Date of Patent: Dec. 11, 2018

(54) AUTONOMOUS VEHICLE SEAT POSITIONING SYSTEM

(71) Applicant: Nissan North America, Inc., Franklin, TN (US)

(72) Inventor: Adrian Tan, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 3 days.

(21) Appl. No.: 15/443,879

(22) Filed: Feb. 27, 2017

(65) Prior Publication Data

US 2018/0244174 A1   Aug. 30, 2018

(51) Int. Cl.
*B60N 2/02*   (2006.01)
*G05D 1/00*   (2006.01)
(Continued)

(52) U.S. Cl.
CPC ............ *B60N 2/0244* (2013.01); *B60J 7/043* (2013.01); *B60K 35/00* (2013.01); *B60N 2/002* (2013.01);
(Continued)

(58) Field of Classification Search
CPC ...... B60N 2/228; B60N 2/0244; B60N 2/002; B60N 2/22; B60J 7/043; B60K 35/00;
(Continued)

(56) References Cited

U.S. PATENT DOCUMENTS

| 6,240,352 B1 | 5/2001 | McCurdy |
| 6,733,133 B2 | 5/2004 | Egle et al. |

(Continued)

FOREIGN PATENT DOCUMENTS

| DE | 4226747 C1 | 12/1993 |
| EP | 2840000 A2 | 2/2015 |

(Continued)

OTHER PUBLICATIONS

Unpublished U.S. Appl. No. 15/443,824, filed Feb. 27, 2017, entitled Autonomous Vehicle Seat Positioning System.

*Primary Examiner* — Gertrude Arthur Jeanglaude
(74) *Attorney, Agent, or Firm* — Global IP Counselors, LLP

(57) ABSTRACT

An autonomous vehicle seat positioning system includes a seat controller connected to a autonomous vehicle controller and a positioning mechanism of a seat assembly. The seat controller is configured to operating the positioning mechanism such that with the autonomous vehicle controller operating the vehicle in a self-driving mode and the vehicle operator's seat assembly being in a reclined setting: in response to the autonomous vehicle controller detecting an emergency condition requiring a change to the manual driving mode, the seat controller operates the positioning mechanism to move the operator's seat assembly from the reclined setting to the upright setting in an emergency re-positioning mode, and in response to the autonomous vehicle controller detecting a non-emergency condition requiring a change to the manual driving mode, the seat controller operates the positioning mechanism to move the operator's seat assembly from the reclined setting to the upright setting in a non-emergency re-positioning mode.

15 Claims, 9 Drawing Sheets

(51) Int. Cl.
*B60N 2/22* (2006.01)
*B60N 2/00* (2006.01)
*B60K 35/00* (2006.01)
*B60J 7/043* (2006.01)
*B60R 1/00* (2006.01)

(52) U.S. Cl.
CPC ............... *B60N 2/22* (2013.01); *B60R 1/00* (2013.01); *G05D 1/0088* (2013.01); *B60K 2350/106* (2013.01); *B60K 2350/2013* (2013.01); *B60K 2350/352* (2013.01); *B60K 2350/922* (2013.01); *B60R 2300/105* (2013.01); *B60R 2300/207* (2013.01); *B60R 2300/8006* (2013.01)

(58) Field of Classification Search
CPC ...... B60K 2350/106; B60K 2350/2013; B60K 2350/352; B60K 2350/922; B60R 1/00; B60R 2300/105; B60R 2300/207; B60R 2300/8006; G05D 1/0088
USPC ........................................................ 701/28
See application file for complete search history.

(56) References Cited

U.S. PATENT DOCUMENTS

| | | | |
|---|---|---|---|
| 8,231,165 | B2 | 7/2012 | Demma |
| 9,184,778 | B2 | 11/2015 | Tan |
| 9,227,531 | B2 | 1/2016 | Cuddihy et al. |
| 9,244,462 | B2 | 1/2016 | Pedersen |
| 9,248,819 | B1 | 2/2016 | Tan |
| 9,404,761 | B2 | 8/2016 | Meuleau |
| 9,507,345 | B2 | 11/2016 | Takamatsu |
| 2008/0272623 | A1 | 11/2008 | Kadzban et al. |
| 2012/0173069 | A1 | 7/2012 | Tsimhoni et al. |
| 2015/0094897 | A1 | 4/2015 | Cuddihy et al. |
| 2016/0082976 | A1 | 3/2016 | Sugioka |
| 2018/0056816 | A1* | 3/2018 | Kim ................ B60N 2/0228 |

FOREIGN PATENT DOCUMENTS

| | | |
|---|---|---|
| EP | 3025921 A1 | 6/2016 |
| EP | 3031724 A1 | 6/2016 |
| JP | 01-245287 A | 9/1989 |

\* cited by examiner

US 10,150,386 B2

AUTONOMOUS VEHICLE SEAT POSITIONING SYSTEM

BACKGROUND

Field of the Invention

The present invention generally relates to an autonomous vehicle seat positioning system. More specifically, the present invention relates to an autonomous vehicle seat positioning system configured to automatically re-position an operator's seat assembly from a relaxation or reclined orientation to a driving or upright orientation.

Background Information

Autonomous vehicles are configured to operate a vehicle in a self-driving mode and a manual driving mode. The occupant of an operator's seat assembly of an autonomous vehicle can relax while the autonomous vehicle is operating in the self-driving mode.

SUMMARY

One object of the present disclosure is to provide an autonomous vehicle with a seat positioning system that automatically moves an operator's seat assembly from a relaxation or reclined orientation to a driving or upright orientation depending in response to a change of the mode for operation of the autonomous vehicle from a self-driving mode to a manually operated mode.

In view of the state of the known technology, one aspect of the present disclosure is to provide an autonomous vehicle seat positioning system, with an autonomous vehicle controller, an operator's seat assembly and a seat controller. The autonomous vehicle controller is configured to operate a vehicle in a self-driving mode and a manual driving mode. The operator's seat assembly includes a positioning mechanism configured to move the operator's seat assembly between a reclined orientation or setting and an upright orientation or setting. The seat controller is connected to the autonomous vehicle controller and the positioning mechanism of the vehicle seat assembly. The seat controller is configured to operating the positioning mechanism such that with the autonomous vehicle controller operating the vehicle in the self-driving mode and the vehicle operator's seat assembly being in the reclined orientation, the following operations are conducted: in response to the autonomous vehicle controller detecting an emergency condition requiring a change to the manual driving mode, the seat controller operates the positioning mechanism to move the operator's seat assembly from the reclined setting to the upright setting in an emergency re-positioning mode; and in response to the autonomous vehicle controller detecting a non-emergency condition requiring a change to the manual driving mode, the seat controller operates the positioning mechanism to move the operator's seat assembly from the reclined setting to the upright setting in a non-emergency re-positioning mode.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
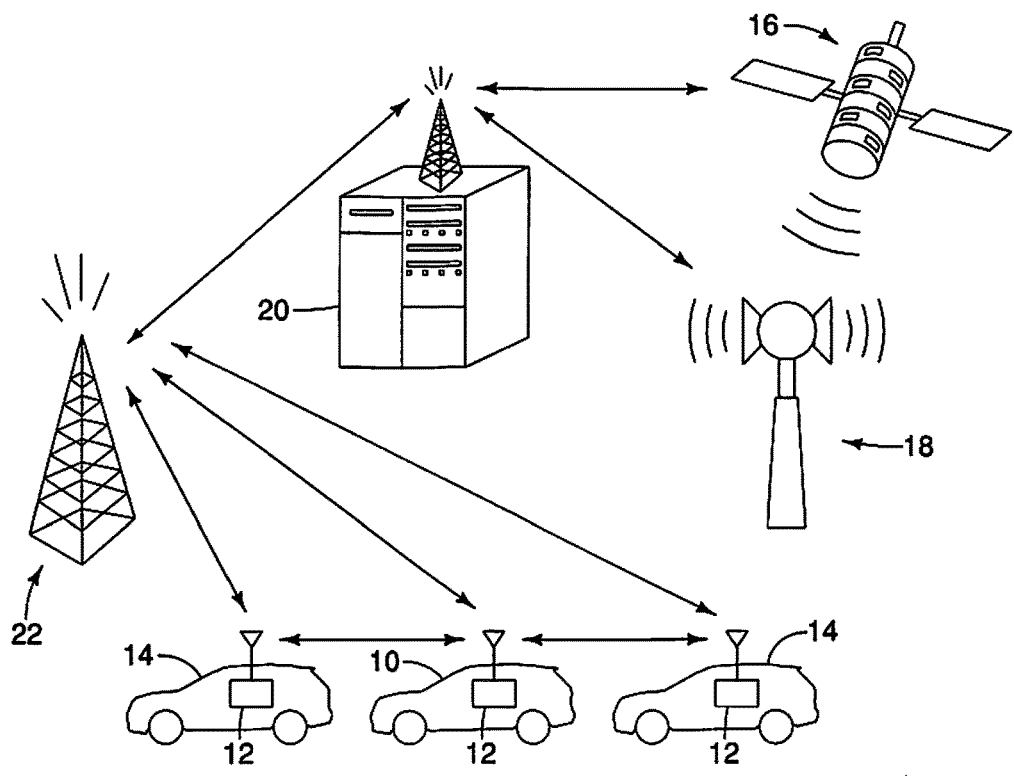
FIG. 1 is a schematic view of an autonomous vehicle system that includes at least a vehicle having a seat positioning system in accordance with one embodiment.
Figure 2:
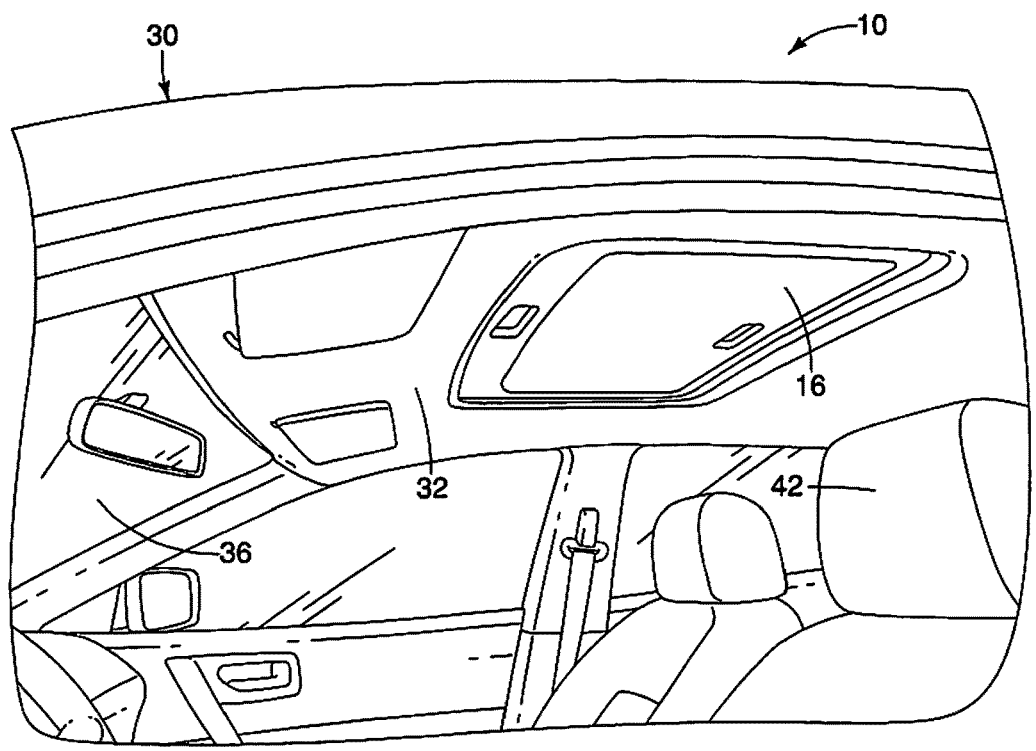
FIG. 2 is a perspective view of a portion of the vehicle showing a display installed to a roof structure of the vehicle in accordance with the one embodiment.

FIG. 1 is a block diagram illustrating a plurality of vehicles 10, 10a and 10b that are each equipped with an autonomous vehicle controller 12 that can operate as part of a vehicle control system (autonomous vehicle network or system) depicted schematically in FIG. 1. As shown in FIGS. 2, the vehicle 10 also includes a display 16 that is installed within the vehicle 10, as described in greater detail below. As shown in FIGS. 3-6, the vehicle 10 also includes an autonomous vehicle seat positioning system 18 (also referred to as the seat positioning system 18) that is configured to operate in concert with operations of the autonomous vehicle controller 12, as described in greater detail below.

The autonomous vehicle controller 12 communicates with at least one of the vehicles 10a and 10b that can also include the autonomous vehicle controller 12. Alternatively, the other vehicles 10a and 10b can include another type of two-way communication system, such as an adaptive cruise control system, that is capable of communicating information about at least the location and speed of the other vehicles 10a and 10b in a conventional manner.

The autonomous vehicle controller 12 of the vehicle 10 and the vehicles 10a and 10b communicates with a two-way wireless communications network. As seen in FIG. 1, for example, the two-way wireless communications network can include one or more global positioning satellites 20 (only one shown), and one or more terrestrial units, such as roadside (terrestrial) units 22 (two are shown), and a base station or external server 24. The global positioning satellites 20 and the roadside units 22 send and receive signals to and from the autonomous vehicle controller 12 of the vehicle 10 and the vehicles 10a and 10b via communication components 12a (connected to the autonomous vehicle controller 12). The base station 24 sends and receives signals to and from the vehicle control system 12 of the host vehicle 10 and the vehicles 10a and 10b via a network of the roadside units 22, or any other suitable two-way wireless communications network.

As shown in more detail in FIG. 6, the autonomous vehicle controller 12 is connected to elements of the seat positioning system 18, as described further below. The autonomous vehicle controller 12 is configured to operate the vehicle 10 in a self-driving mode and a manual driving mode. In the self-driving mode, the autonomous vehicle controller 12 controls all driving related operations such as speed, steering and braking operations of the vehicle 10. In the manual driving mode, the autonomous vehicle controller 12 stops operating the vehicle 10, and a human driver or vehicle operator H (FIGS. 3 and 4) operates the vehicle 10 manually, controlling speed, steering and braking operations manually. The autonomous vehicle controller 12 is also connected to sensors and vehicle exterior cameras (shown in FIGS. 5 and 6). The sensors installed to or along exterior portions of the front, rear and opposite sides of the vehicle 10 and detect proximity of other vehicles in a conventional manner. The vehicle exterior cameras are similarly mounted to exterior surfaces and capture images of movements around the exterior of the vehicle 10 in a conventional manner. Since operations of an autonomous vehicle by the autonomous vehicle controller 12, and configurations of the autonomous vehicle controller 12 are conventional and therefore well known, as disclosed by numerous U.S. patents and U.S. published patent applications, further description of operations and configurations of the autonomous vehicle controller 12 are omitted for the sake of brevity.

A brief description of the vehicle 10 is now provided with specific reference to FIGS. 2-6. The vehicle 10 has a vehicle body structure 30 with a roof structure 32 and a floor structure 34 with a passenger compartment 36 defined therebetween. The vehicle 10 also includes a steering column 38, a brake and accelerator pedal assembly 40 and a operator's seat assembly 42.

The display 16 can be installed directly to an interior surface of the roof structure 32. Alternatively, the display 16 can be part of a sun shade of a sun roof assembly. Further description relating to the display 16 are disclosed in U.S. patent application Ser. No. 15/383,565, filed Dec. 19, 2016. U.S. patent application Ser. No. 15/383,565 is incorporated herein in its entirety. U.S. patent application Ser. No. 15/383, 565 also discloses operational features of the display 16.

Figure 3:
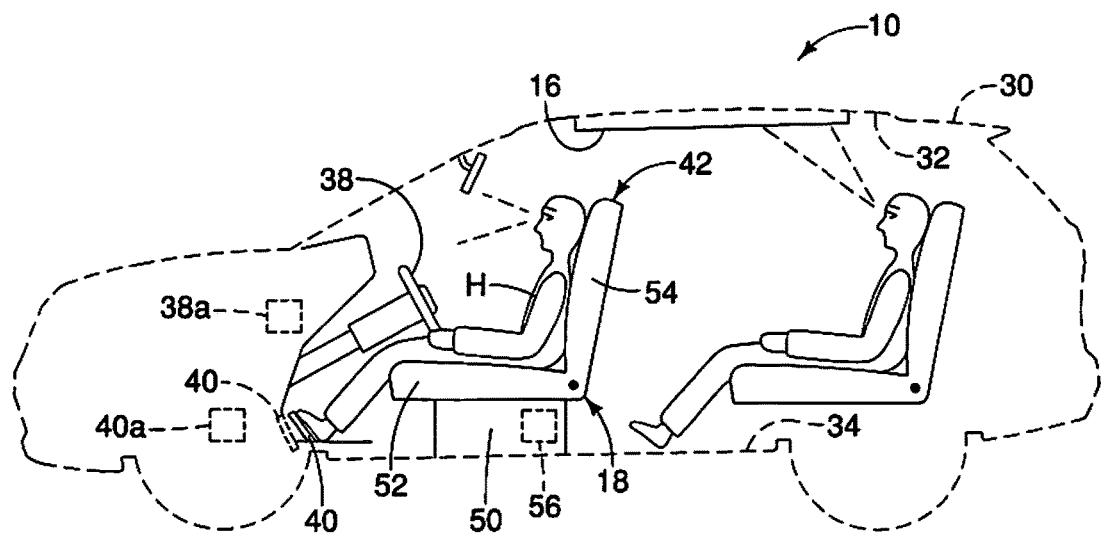
FIG. 3 is a schematic side view of the vehicle showing an operator's seat assembly, a steering column and a brake and accelerator pedal assembly whose positions and orientations can be automatically re-positioned by the seat positioning system, with the operator's seat assembly, the steering column and the brake and accelerator pedal assembly shown in an upright position with a vehicle operator seated in the seat assembly with an autonomous vehicle controller set for manual driving of the vehicle in accordance with the one embodiment.
Figure 4:
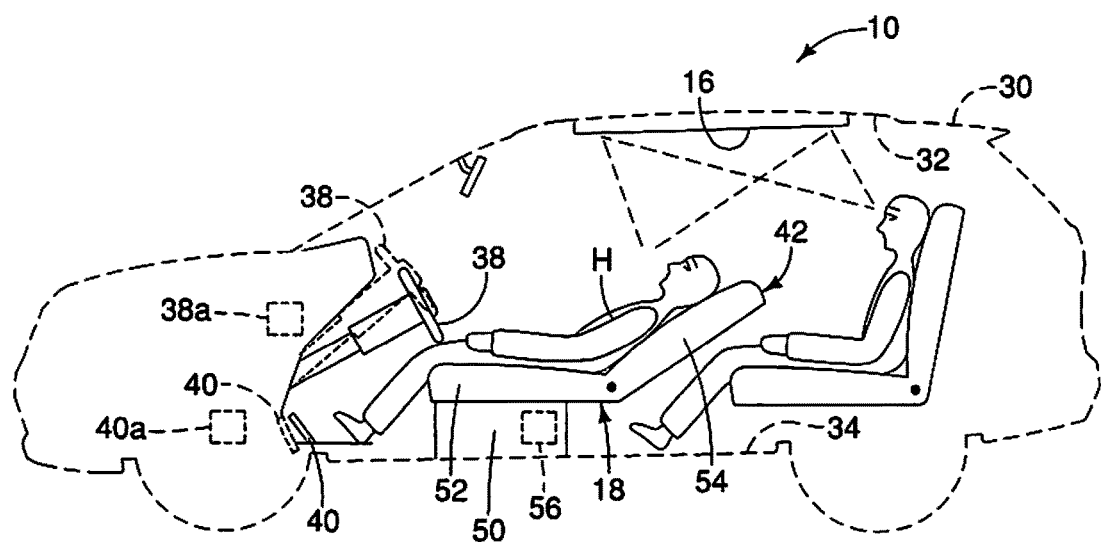
FIG. 4 is another schematic side view of the vehicle similar to FIG. 3 showing the operator's seat assembly, the steering column and the brake and accelerator pedal assembly in reclined and retracted orientations with the vehicle operator seated in the seat assembly with the autonomous vehicle controller set for self-driving in accordance with the one embodiment.

The steering column 38 is installed to an instrument panel and/or a dash wall at a front portion of the passenger compartment 36 in a conventional manner, as shown schematically in FIGS. 3-4. The steering column 38 includes a steering column positioner 38a that allows for electronically controlled positioning of the steering column 38, with angular and telescoping movements. The steering column 38 is position-able between a retracted orientation shown in phantom or dashed lines in FIG. 4, and any of a plurality of in-use orientation, such as that shown in solid lines in FIGS. 3-4.

The brake and accelerator pedal assembly 40 are conventional mechanisms that provide the vehicle driver with control of braking operations and engine accelerating operations in a conventional manner. The brake and accelerator pedal assembly 40 includes a pedal positioner 40a that allows for electronically controlled positioning of the brake and accelerator pedal assembly 40. The brake and accelerator pedal assembly 40 is position-able between a retracted orientation shown in phantom or dashed lines in FIG. 4, and any of a plurality of in-use orientations, such as tine in-use orientation shown in solid lines in FIGS. 3-4.

As shown schematically in FIGS. 3 and 4, the operator's seat assembly 42 is installed to the floor structure 34 of the vehicle 10. The operator's seat assembly 42 includes a base portion 50, a seat cushion portion 52, a seatback portion 54, and a positioning mechanism 56. The base portion 50 is preferably directly attached to the floor structure 34 of the passenger compartment 36 within the vehicle 10. The seat cushion portion 52 is directly supported to the base portion 50 in a conventional manner and is linearly movable relative to and along the base portion 50. Specifically, the seat cushion portion 52 can undergo forward and rearward movement relative to the base portion 50 and the floor structure 34.

The seatback portion 54 is supported for pivotal movement relative to the seat cushion portion 52. More specifically, the seatback portion 54 is supported by a pivoting structure (not shown) that is directly connected to the seatback portion 54 and further connected to the seat cushion portion 52. Hence, the seatback portion 54 pivots about a pivot axis where the pivot axis is fixed in position relative to the seat cushion portion 52.

The positioning mechanism 56 can include two separate electronically controlled devices and/or motors that position and reposition portions of the operator's seat assembly 42. Specifically, the positioning mechanism 56 moves and positions the seat cushion portion 52 relative to the floor structure 34. The positioning mechanism 56 can include a conventional linear track (not shown) and motor (not shown) that effects the movement and repositioning of the seat cushion portion 52. The positioning mechanism 56 is configured to move the seat cushion portion 52 in a vehicle forward and a vehicle rearward directions to any of a plurality of positions relative to the base portion 50. The positioning mechanism 56 also includes a motor (not shown) and gearing mechanism (not shown) that is configured to move the seatback portion 54 to any of a plurality of upright orientations and a plurality of reclined orientations relative to the seat cushion portion 52.

The positioning mechanism 56 is configured to move the seat cushion portion 52 in a vehicle forward and a vehicle rearward directions to any of a plurality of positions relative to the base portion 50. The number of the plurality of positions of the seat cushion portion 52 relative to the base portion 50 depends on the configuration of the positioning mechanism 56. Specifically, the electric motor (not shown) can be any of a variety of positioning motors, such as a stepper motor, that via appropriate gearing can finely and accurately move and position the seat cushion portion 52 returning it to predetermined locations relative to the base portion 50 in a conventional manner.

The positioning mechanism 56 is configured to move the seatback portion 54 to any of the plurality of upright orientations and the plurality of reclined orientations relative to the seat cushion portion 52, as mentioned above. The plurality of upright orientations varies and are generally defined as orientations of the seatback portion 54 that position a vehicle operator seated in the operator's seat assembly 42 such that the vehicle operator can steer and operate the vehicle 10. The plurality of reclined orientations varies and are generally defined as orientations of the seatback portion 54 that position a vehicle operator seated in the operator's seat assembly 42 such that the vehicle operator can view the display 16, or rest.

Not all vehicle operators are the same size. Therefore, the vehicle operator adjusts the position of the seat cushion portion 52 relative to the base portion 50 and the angle of the seatback portion 54 relative to the seat cushion portion 52 to suit his or her needs and comfort. The depictions in FIG. 3 show one example of an upright orientation and FIG. 4 shows one example of a reclined orientation.

Each vehicle operator H that regularly operates the vehicle 10 can save in memory, his or her own settings. Specifically, the operator H can adjust the operator's seat assembly 42 to a position and orientation optimal for manually driving the vehicle 10 and save the position and orientation in memory as upright orientation setting. Similarly, the operator H can adjust the operator's seat assembly 42 to a position and orientation optimal for relaxing and/or watching the display 16 and save the position and orientation in memory as reclined orientation setting for subsequent use with the autonomous vehicle controller 12 operating the vehicle in the self-driving mode.

A further description of a system and operation of the system for saving upright orientation settings and reclined orientation settings can be found in U.S. patent application Ser. No. 15/443,824 filed Feb. 27, 2017. The entire contents of U.S. patent application Ser. No. 15/443,824 are incorporated herein by reference in its entirety.

Figure 5:
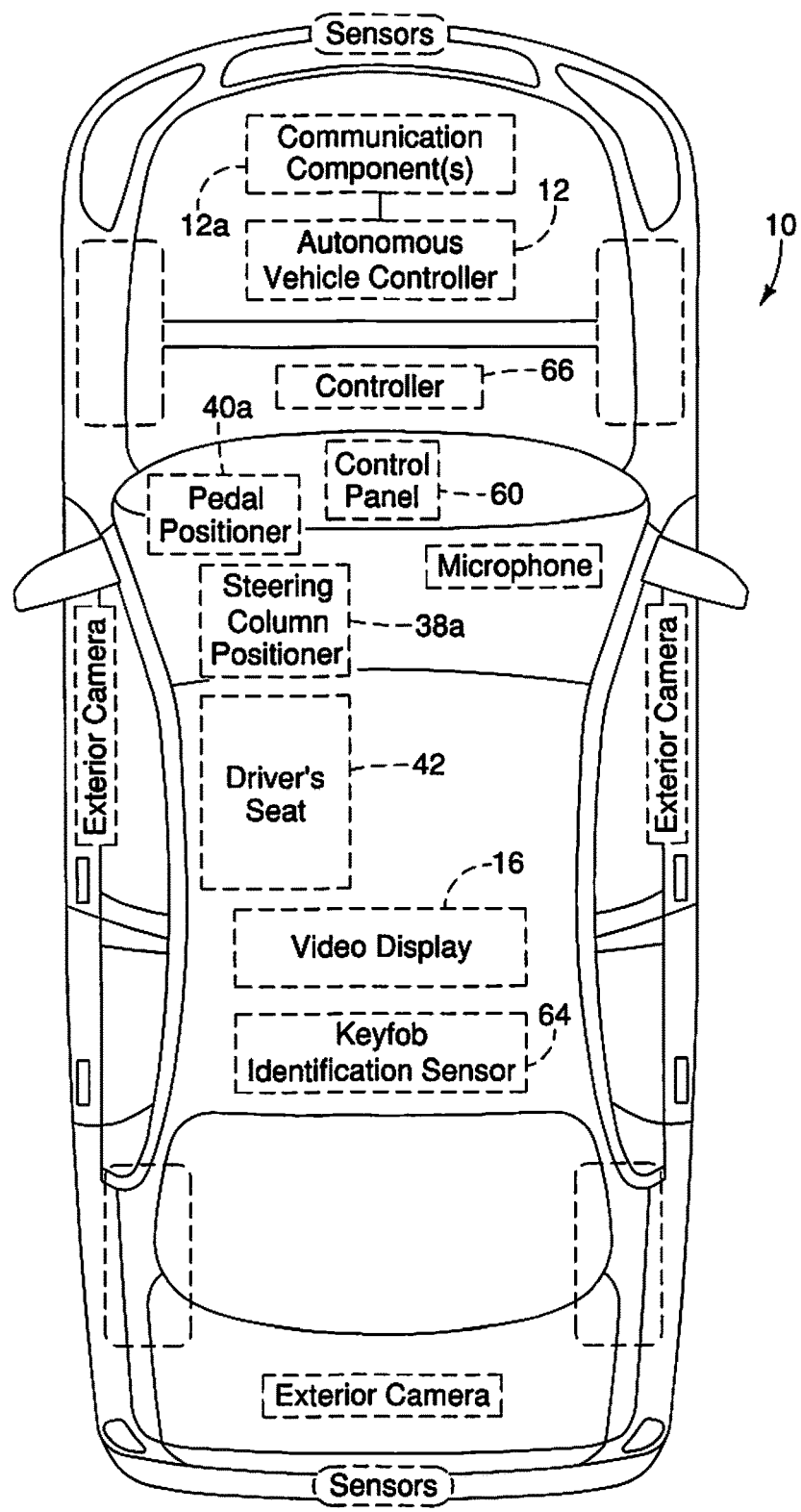
FIG. 5 is a schematic view of the vehicle showing various components of the autonomous vehicle seat positioning system in accordance with the one embodiment.
Figure 6:
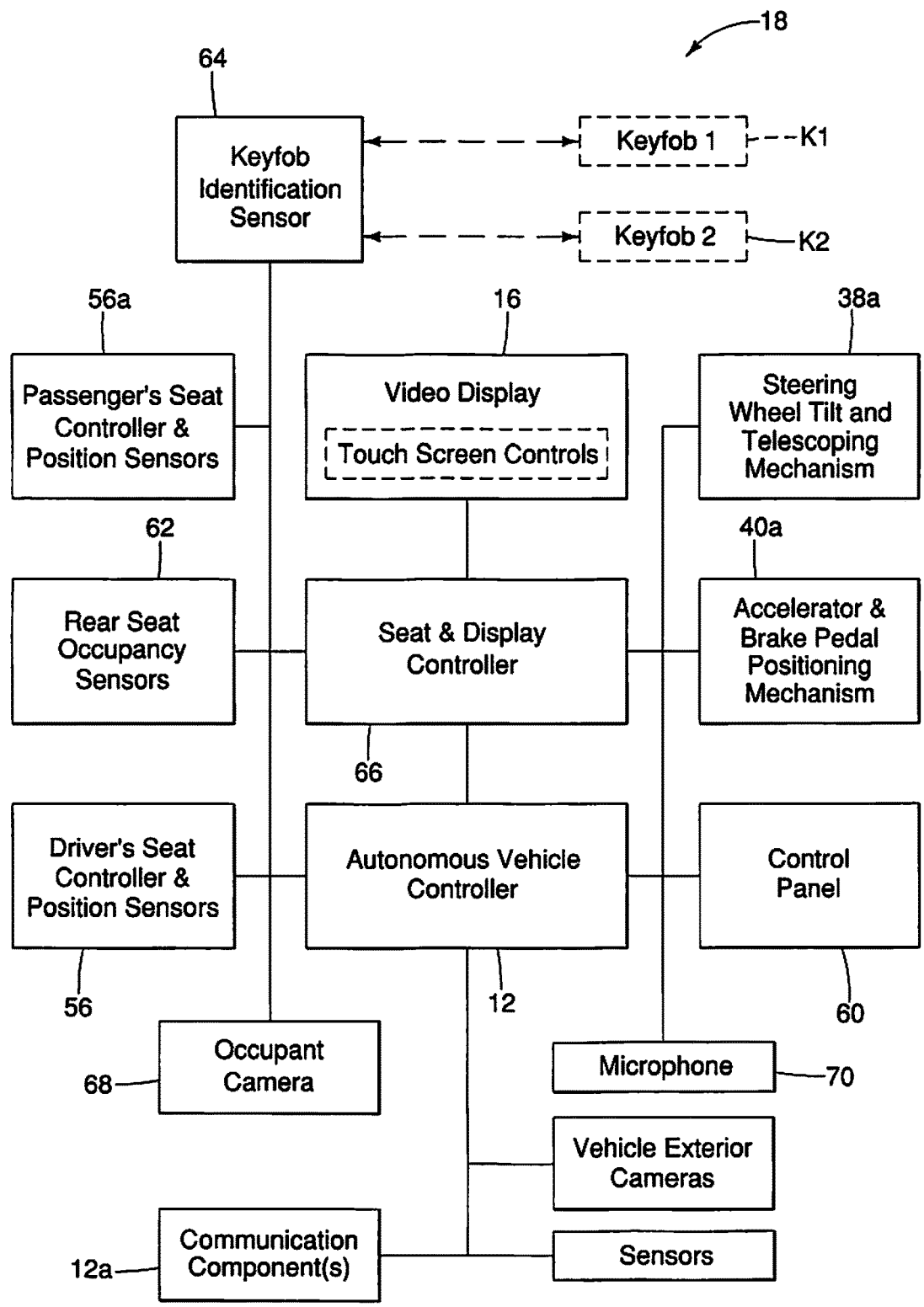
FIG. 6 is a block diagram of the vehicle showing various components of the autonomous vehicle seat positioning system including as a control panel and a seat and display controller in accordance with the one embodiment.

A description of the seat positioning system 18 (also referred to as an autonomous vehicle seat positioning system 18) is now provided with initial reference to FIGS. 5 and 6. The seat positioning system 18 basically includes the display 16, the steering column positioner 38a, the pedal positioner 40a, the positioning mechanism 56 of the operator's seat assembly 42, a positioning mechanism 56a (for a passenger's seat), a control panel 60, rear seat occupancy sensors 62, keyfob identification sensor 64, a first keyfob $K_1$, a second keyfob $K_2$, a seat and display controller 66, an optional occupant camera 68, an optional microphone 70 and the autonomous vehicle controller 12.

As shown in FIG. 6, the display 16, the steering column positioner 38a, the pedal positioner 40a, the positioning mechanism 56, the positioning mechanism 56a, the control panel 60, the rear seat occupancy sensors 62, the keyfob identification sensor 64, the optional occupant camera 68, the optional microphone 70 and the autonomous vehicle controller 12 are all electronically connected to the seat and display controller 66 (also referred to as a seat controller 66).

Figure 8:
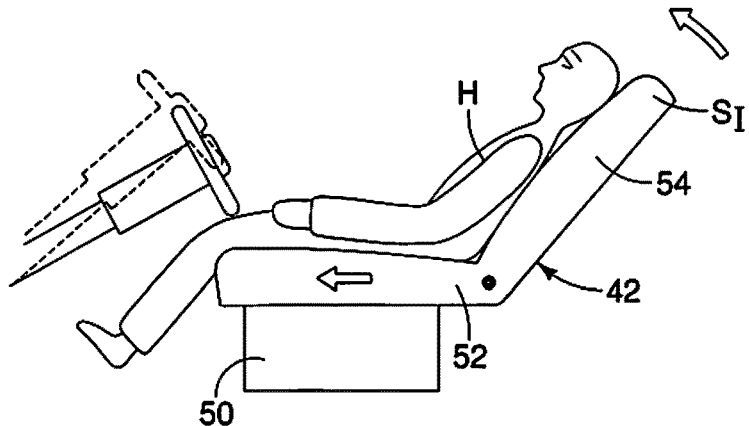
FIG. 8 is another schematic view of the operator's seat in an intermediate orientation after a first movement toward the upright position in the two-stage movement sequence in accordance with the one embodiment.

As indicated in FIG. 8, the keyfob identification sensor 64 communicates with each of the first keyfob $K_1$ and the second keyfob $K_2$ determining the presence of one or the other of the first keyfob $K_1$ and the second keyfob $K_2$.

The display 16 is, for example, a flat panel display configured to display data, camera images, and/or videos such as movies or the like. The steering column positioner 38a is an electronically controlled device that responds to at least two sources of operational commands: commands inputted by the vehicle operator H via the control panel 60 changing an angular orientation of the steering column 38 and for changing the telescopic extended position of the steering column 38; and commands sent by the seat controller 66 to change the angular orientation of the steering column 38 and change the telescopic extended position of the steering column 38 based upon saved or preset position settings.

The pedal positioner 40a is an electronically controlled device that also responds to at least two sources of operational command: commands inputted by the vehicle operator H via the control panel 60 changing the position of the brake and accelerator pedal assembly 40 from at least an operating orientation and a retracted orientation; and commands sent by the seat controller 66 to change the location and orientation of the brake and accelerator pedal assembly 40 based upon saved or preset position settings.

The positioning mechanism 56 of the operator's seat assembly 42 (the vehicle operator's seat) is an electronically controlled device that also responds to at least two sources of operational command: commands inputted by the vehicle operator H via the control panel 60 manually adjusting the position of the seat cushion portion 52 and the orientation of the seatback portion 54; and commands sent by the seat controller 66 to reposition the seat cushion portion 52 and the orientation of the seatback portion 54 based upon saved or preset position settings.

The seat positioning system 18 can also include the optional positioning mechanism 56a (for a passenger's seat), which is operated in a manner similar to that of the positioning mechanism 56 of the operator's seat assembly 42.

The control panel 60 can be installed in any of a plurality of locations within the vehicle 10, but is preferably installed to either the instrument panel within the passenger compartment 36 or a center console (not shown) adjacent to the operator's seat assembly 42. Further, the display 16 can include touch screen controls that provide functions and data input capability similar to that of the control panel 66. The control panel 60 (and the touch screen controls of the display 16) is configured to receive various inputs, such as seat related inputs made by the vehicle operator H seated in the operator's seat assembly 42 relating positioning and orientation of the steering column 38, positioning of the brake and accelerator pedal assembly 40, positioning of the seat cushion portion 52 and orientation of the seatback portion 54, among other vehicle related inputs and controls.

The rear seat occupancy sensors 62 are located within a rear seat assembly within the vehicle 10 and provide the seat controller 66 with information relating to the presence and locations of passengers on the rear seat assembly.

The keyfob identification sensor 64 can be a plurality of sensors (not shown) located around the vehicle body structure for identifying the presence of one or the other of the first keyfob $K_1$ and the second keyfob $K_2$. The first keyfob $K_1$ can be associated with a first vehicle operator and the second keyfob $K_2$ can be associated with a second vehicle operator. However, for purposes of understanding the operation and configuration of the vehicle seat positioning system 18, only a single vehicle operator, the vehicle operator H, is referred to herein below for the sake of brevity.

The optional occupant camera 68 can be installed to any of a variety of locations and is configured to provide image information regarding the position and orientation of the operator's seat assembly 42, and facial recognition images of the vehicle operator H and enabling the seat and display controller 66 to determine the state of vehicle operator H (watching the display 16 or asleep in the reclined orientation) and current orientation of the operator's seat assembly 42. For example, the occupant camera 68 can be configured to capture images of the vehicle operator H (the occupant) seated in the operator's seat assembly 42. The occupant camera 68 is connected to the seat controller 66 such that the seat controller 66 can evaluate the images of the vehicle operator H with the operator's seat assembly 42 in the reclined setting and determine whether or not the vehicle operator H (occupant) of the operator's seat assembly 42 is currently asleep.

The optional microphone 70 can be installed to any of a variety of locations within the vehicle 10 and is configured to receive audio commands from the first vehicle operator H. The microphone 70 is connected to the seat controller 66 such that the seat controller 66 can evaluate the sound emitted by the vehicle operator H in the operator's seat assembly 42 and determine whether the current condition of the vehicle operator H of the operator's seat assembly 42.

Using information gathered by the occupant camera 68 and/or the microphone 70, the seat controller 66 is programmed to evaluate the condition of the vehicle operator H and determine whether or not the vehicle operator H is asleep, and how long the occupant has been asleep. If the seat controller 66 determines that the vehicle operator H has been asleep for longer than a predetermined time period (a default time or a time set by the vehicle operator H), the seat controller 66 can cause the operator's seat assembly 42 to vibrate, thereby awakening the vehicle occupant H.

The seat and display controller 66 (hereinafter, the seat controller 66) is configured to operate as follows. Via the control panel 60 or the touch screen controls of the display 16, the vehicle operator H can adjust the position and orientation of the operator's seat assembly 42 and save a unique upright orientation setting that is comfortable and convenient for operating the vehicle 10 with the autonomous vehicle controller 12 operating in the manual driving mode. Similarly the vehicle operator H can save a unique reclined orientation setting (also referred to as a relaxation setting) for relaxing and/or watching the display 16 when the autonomous vehicle controller 12 is operating the vehicle 10 in the self-driving mode. The seat controller 66 is further configured to move the operator's seat assembly 42 to the position and orientation corresponding to that saved in the upright orientation setting and/or the reclined orientation setting in response to the vehicle operator H inputting the corresponding command via the control panel 60 or the touch screen controls of the display 16. The seat and display controller 66 is further configured to automatically move the operator's seat assembly 42 to the position and orientation corresponding to the upright orientation setting from the reclined orientation setting in response to signals from the autonomous vehicle controller 12, as is described further below.

As mentioned above, the autonomous vehicle controller 12 is configured to operate the vehicle 10 in the self-driving mode where the autonomous vehicle controller 12 operates the vehicle 10, controlling steering, acceleration, and braking operations. The autonomous vehicle controller 12 is also configured to switch to the manual driving mode either in response to an input via the control panel 60 by the vehicle operator H or in response to various circumstances. For example, when preparing to enter the self-driving mode, the autonomous vehicle controller 12 is provided with driving parameters entered by the vehicle operator H, such as a GPS designated destination. The GPS (global positioning satellite system) is a conventional part of the autonomous vehicle controller 12. The autonomous vehicle controller 12 can switch to the manual driving mode in response to determining that the vehicle 10 is close to or has reached a final destination. Depending upon settings inputted by the vehicle operator H, the autonomous vehicle controller 12 can be programmed to alert the vehicle operator H that the vehicle 10 has reached the inputted destination or the autonomous vehicle controller 12 can be programmed to provide the vehicle operator H with a warning indication that the vehicle 10 is close to the destination. Such a warning indication can include, but is not limited to, causing the operator's seat assembly 18 to vibrate, providing an audible signal, providing a visual indication on the display 16 that the vehicle 10 is arriving at the destination soon, or combinations of these and other warning indications.

The seat controller 66 can also provide images to the display 16 captured by one or more of the exterior cameras of the vehicle 10. Specifically, the seat controller 66 is configured to display information on the display 16 including captured images of an area forward of the vehicle 10 with the operator's seat assembly in the reclined setting, or other captured views, such as side and rear views around the vehicle 10.

The autonomous vehicle controller 12 is also configured to switch to the manual driving mode in response to detection of a road condition, a road hazard or an emergency situation that requires the vehicle operator H to resume manual operation of the vehicle 10. Similarly, if the autonomous vehicle controller 12 determines that there is even a possibility of a road condition, a road hazard or an emergency situation that might require the vehicle operator H to resume manual operation of the vehicle 10, the autonomous vehicle controller 12 can switch to the manual driving mode.

In response to the autonomous vehicle controller 12 determining that there is a need to switch to the manual driving mode, the seat positioning system 18 is configured to operate the positioning mechanism 56 of the operator's seat assembly 42, the steering column positioner 38a and the pedal positioner 40a to move the operator's seat assembly 42, the steering column 38 and the brake and accelerator pedal assembly 40 to their upright driving positions and orientations so that the vehicle operator H can resume manual control of all driving operations of the vehicle 10.

Example of detected or determined road conditions, road hazards and emergency situations that can cause the autonomous vehicle controller 12 to determine a need to switch from the self-driving mode to the manual driving mode, include, for example: notification of an accident on the road ahead; detecting a sudden slow down or stopping of a vehicle or vehicles cars forward of the vehicle 10; notification of construction in the roadway ahead of the vehicle 10; notification of inclement weather ahead of the vehicle 10 (such as rain or snow); a detected problem with the vehicle 10; and notification of a problem with a vehicle forward of the vehicle 10.

The autonomous vehicle controller 12 determines the severity of the situation detected and the information received regarding the road conditions ahead and determines whether the seat controller 66 should be operated in an emergency re-positioning mode or a non-emergency re-positioning mode.

In response to the autonomous vehicle controller 12 determining that an emergency condition exists and that there is a need to change to the manual driving mode, the autonomous vehicle controller 12 sends a signal to the seat controller 66 causing the seat controller 66 to operate the positioning mechanism 56 to move the operator's seat assembly 42 from the reclined setting to the upright setting in the emergency re-positioning mode.

In response to the autonomous vehicle controller 12 detecting a non-emergency condition requiring a change to the manual driving mode, the seat controller 66 operates the positioning mechanism to move the operator's seat assembly 42 from the reclined setting to the upright setting in a non-emergency re-positioning mode.

The autonomous vehicle controller 12 is configured such that the emergency condition includes further determining a first level of urgency and a second level of urgency. Further, the seat controller 56 is configured to move the operator's seat assembly 42 to the upright setting using a first emergency movement sequence and a second emergency movement sequence. Specifically, in response to the autonomous vehicle controller 12 determining that the emergency condition includes the first level of urgency, the seat controller 66 employs the first emergency movement sequence in which the seat positioning mechanism 56 is operated to immediately move the operator's seat assembly 42 from the reclined setting to the upright setting with little or no delay. In response to the autonomous vehicle controller 12 determining that the emergency condition includes the second level of urgency, the seat controller 66 employs the second emergency movement sequence in which the seat positioning mechanism 56 is operated to move the operator's seat assembly 42 from the reclined setting to the upright setting within a first pre-determined period of time;. In the depicted embodiment, the first pre-determined period of time is between 30 seconds and 2 minutes, but can be a greater time period.

The autonomous vehicle controller 12 is configured such that the first level of urgency is determined in response to a first group of detected road conditions that include, for example, a road incident that has occurred less than a first predetermined distance ahead (one mile or less ahead) of the vehicle 10, or a weather condition determined to be less that the first predetermined distance ahead of the vehicle 10. The autonomous vehicle controller 12 is configured such that the second level of urgency is determined in response to a second group of detected road conditions that include, for example, a road incident that has occurred greater than the first predetermined distance from the vehicle 10 and less a second predetermined distance (for example, five miles) from the vehicle 10, or the vehicle 10 is approaching a weather condition that has been detected a distance ahead of the vehicle greater than the first predetermined distance from the vehicle and less the second predetermined distance from the vehicle 10.

The autonomous vehicle controller 12 is configured such that the non-emergency condition includes, for example, one of the following: a determination that the vehicle 12 will arrive at a designated destination within a second predetermined period of time, or a determination that the vehicle 12 is in need of re-fueling within the second predetermined period of time, where the second period of time is either a default value of, for example 5 or 10 minutes, or a value set by the vehicle operator H. The second period of time can be designated by the vehicle operator H for non-emergency condition. For example, the vehicle operator H can enter into the seat positioning system 18 via the control panel 60, instructions to alert the vehicle operator H of the need for re-fueling when the level of fuel is below a specified value, or is estimated to be exhausted within a selected amount of time (between 5 and 25 minutes, for example).

In the non-emergency condition where the GPS determines the approximate time the vehicle 10 will reach the designated destination, the vehicle operator H can allow a default time to dominate the seat movement operations or can enter, via the control panel 60, a specific time before reaching the destination for the operator's seat assembly 42 to be returned to the upright stings. The default time can be, for example, five minutes. The specific time can be set by the vehicle operator H as being anywhere from 1 to 25 minutes prior to estimated time of arrival of the vehicle 10 at the destination entered into the GPS of the autonomous vehicle controller 12.

The seat controller 66 is configured such that the non-emergency re-positioning mode includes a non-emergency movement sequence in which the seat controller moves the operator's seat assembly from the reclined setting to the upright setting in a stepped sequence in order to gradually move the occupant of the operator's seat assembly to the upright setting. The stepped non-emergency movement sequence can includes any of a variety of steps. For instance, the stepped non-emergency movement sequence employed by the seat controller 66 can include, for example, a two-stage movement, a three-stage movement or a four-stage movement.

Figure 7:
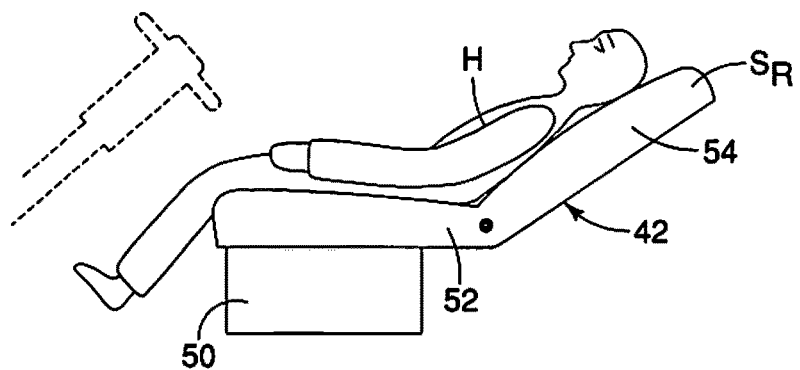
FIG. 7 is a schematic view of the operator's seat in the reclined orientation prior to being moved to the upright position in a two-stage movement sequence in accordance with the one embodiment.
Figure 9:
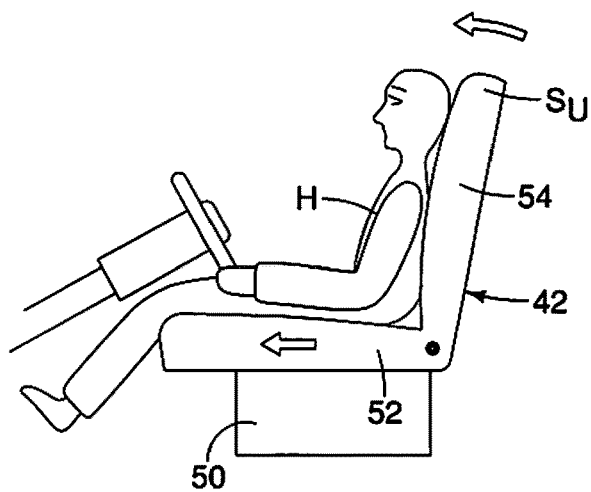
FIG. 9 is a further schematic view of the operator's seat in the upright orientation after a second movement from the intermediate orientation to the upright position in the two-stage movement sequence in accordance with the one embodiment.
Figure 10:
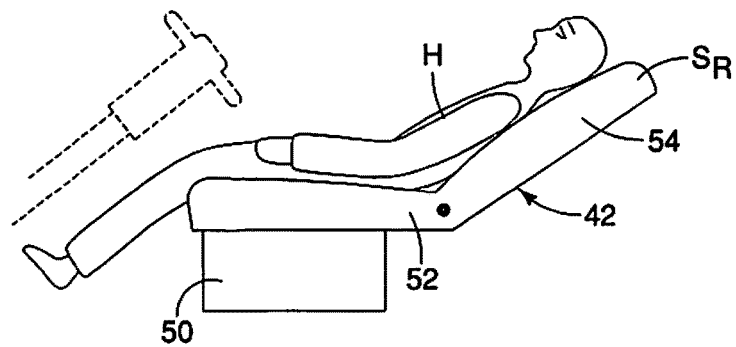
FIG. 10 is a schematic view of the operator's seat in the reclined orientation prior to being moved to the upright position in a four-stage movement sequence in accordance with the one embodiment.
Figure 11:
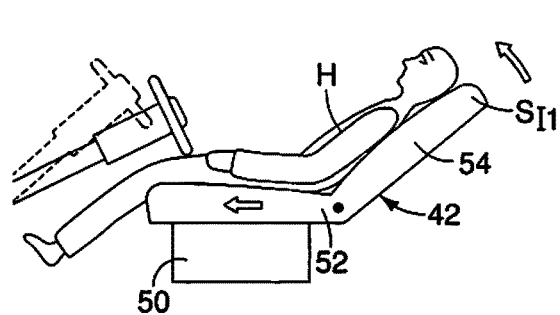
FIG. 11 is another schematic view of the operator's seat in a first intermediate orientation after a first movement toward the upright position in the four-stage movement sequence in accordance with the one embodiment.
Figure 12:
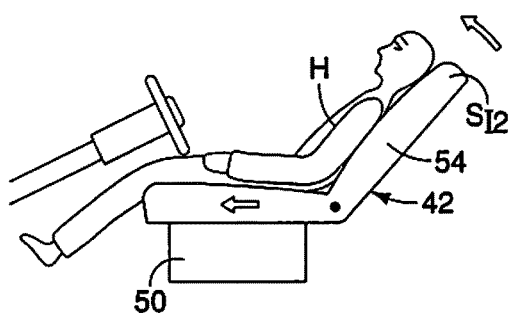
FIG. 12 is yet another schematic view of the operator's seat in a second intermediate orientation after a second movement toward the upright position in the four-stage movement sequence in accordance with the one embodiment.
Figure 13:
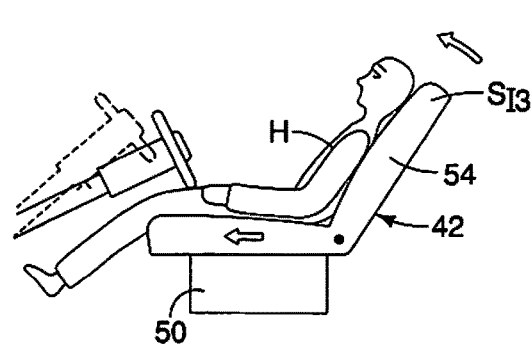
FIG. 13 is still another schematic view of the operator's seat in a third intermediate orientation after a third movement toward the upright position in the four-stage movement sequence in accordance with the one embodiment.

One example of the two-stage movement of the operator's seat assembly 12 is depicted FIGS. 7-9. During a first stage of movement, the operator's seat assembly 42 is moved from the relined setting $S_R$ (FIG. 7) to an intermediate orientation $S_1$ (FIG. 8) where the seatback portion 54 and the seat cushion portion 52 of the operator's seat assembly 42 are moved approximately 50% of the distance between the reclined setting (FIG. 7) and the completed upright setting $S_u$ (FIG. 9). Once the intermediate orientation (FIG. 8) is achieved, movement is halted or paused to give the vehicle operator H an opportunity to, for example, wake up and/or reposition himself or herself if not positioned comfortably. The pause can be for a predetermined number of seconds (for example, 5 to 20 seconds—a default setting or previously set by the vehicle operator H). Thereafter, the operator's seat assembly 42 is moved in a second stage of movement to the saved or default upright settings (FIG. 9).

An of the three-stage movement of the operator's seat assembly 12 (not depicted) of the non-emergency re-positioning mode employed by the seat controller 66 includes a first stage of movement where the operator's seat assembly 42 is moved to a first intermediate orientation (not shown) that is approximately 33% of the distance from the reclined setting to the upright setting. After the first stage of movement, there is a pause for a predetermined number of seconds. Thereafter, the operator's seat assembly 42 is moved to a second intermediate orientation (not shown) approximately 66% of the distance from the reclined setting the upright setting. Thereafter, there can be yet another pause for another predetermined number of seconds and then the operator's seat assembly 42 is moved fully to the upright setting (FIG. 9).

Figure 14:
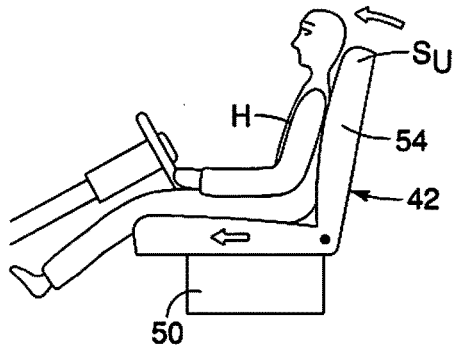
FIG. 14 is a further schematic view of the operator's seat in the upright orientation after a fourth movement from the intermediate orientation to the upright position in the four-stage movement sequence in accordance with the one embodiment.

An example of the four-stage movement of the operator's seat assembly 12 is depicted FIGS. 10-14. During a first stage of movement, the operator's seat assembly 42 is moved from the relined setting $S_R$ (FIG. 10) to a first intermediate orientation (FIG. 11) where the seatback portion 54 and the seat cushion portion 52 of the operator's seat assembly 42 are moved approximately 25% of the distance between the reclined setting (FIG. 10) and the completed upright setting $S_U$ (FIG. 14). Once the first intermediate orientation $S_{11}$ (FIG. 11) is achieved, movement is halted or paused to give the vehicle operator H an opportunity to, for example, wake up and/or reposition himself or herself if not positioned comfortably. The pause can be for a predetermined number of seconds (for example, 5 to 20 seconds—a default setting or previously set by the vehicle operator H). Thereafter during a second stage of movement, the operator's seat assembly 42 is moved from the first intermediate orientation $S_{11}$ (FIG. 11) to a second intermediate orientation S12 (FIG. 12) where the seatback portion 54 and the seat cushion portion 52 of the operator's seat assembly 42 are moved approximately 50% of the distance between the reclined setting (FIG. 7) and the completed upright setting Su (FIG. 14). Once the second intermediate orientation $S_{12}$ (FIG. 12) is achieved, movement is halted or paused again. Thereafter during a third stage of movement, the operator's seat assembly 42 is moved from the second intermediate orientation $S_{11}$ (FIG. 12) to a third intermediate orientation $S_{13}$ (FIG. 13) where the seatback portion 54 and the seat cushion portion 52 of the operator's seat assembly 42 are moved approximately 75% of the distance between the reclined setting SR (FIG. 10) and the completed upright setting $S_U$ (FIG. 14). Once the third intermediate orientation $S_{13}$ (FIG. 14) is achieved, movement is halted or paused again. Thereafter, the operator's seat assembly 42 is moved in a fourth stage of movement to the default upright settings or to the completed upright setting $S_U$ (FIG. 14) designated by the vehicle operator H.

It should be understood that the vehicle operator H can save a setting that designates a time in any of the above movement sequences in which the operator's seat assembly 42 can be vibrated to alert the vehicle operator H prior to the start of any movement of the operator's seat assembly 42.

Further, when the operator's seat assembly 42 is in the reclined setting (FIG. 7) and will shortly be moved out of the reclined setting $S_R$ (FIG. 10), the seat controller 66 (connected to the display 16) can display information relating to the upcoming movement of the operator's seat assembly 42. This information can include, for example, sensora countdown to beginning of movement of the operator's seat assembly 42 in the non-emergency re-positioning mode.

Figure 15:
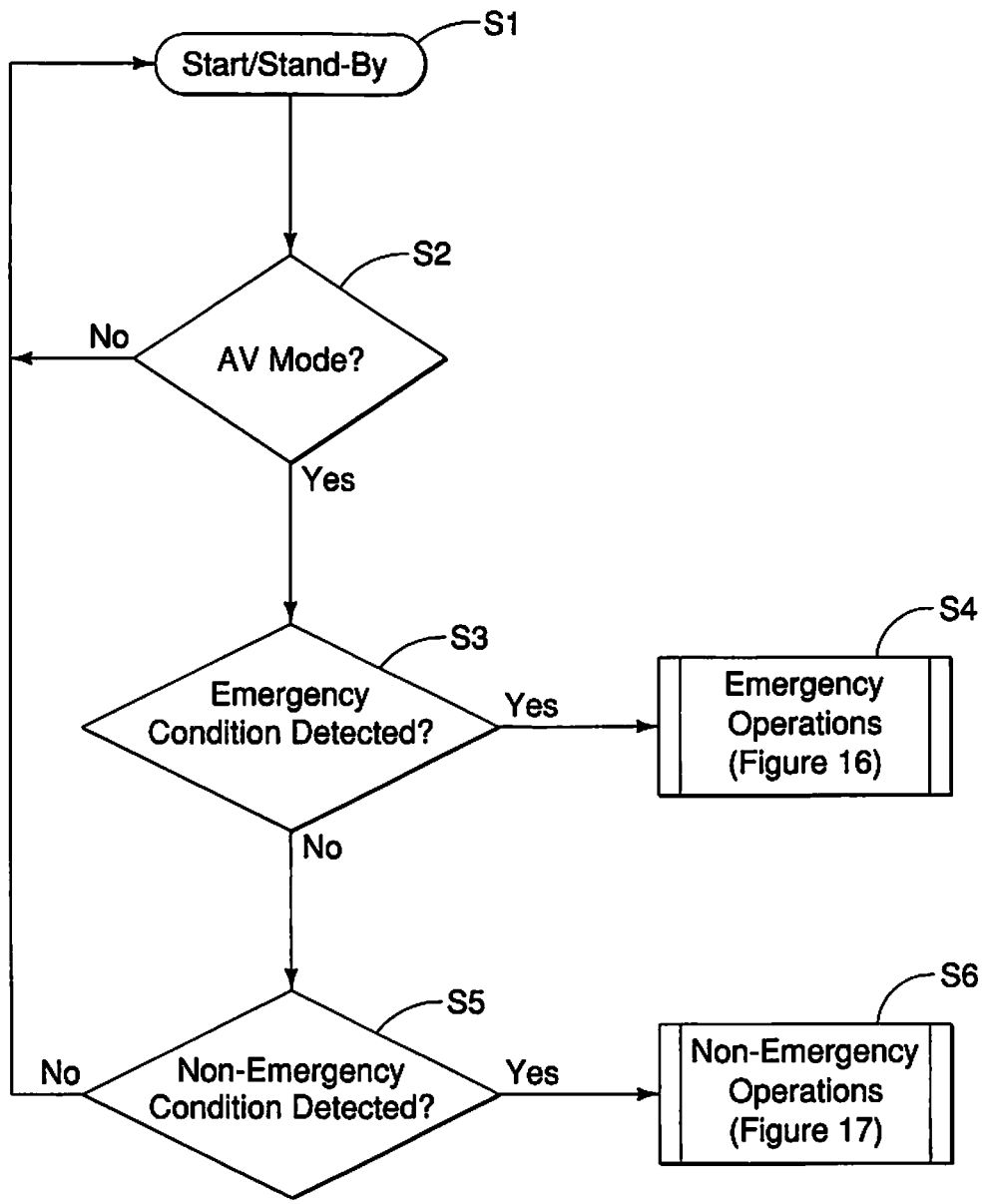
FIG. 15 is a first flowchart showing operational logic conducted by the seat and display controller in accordance with the one embodiment.
Figure 16:
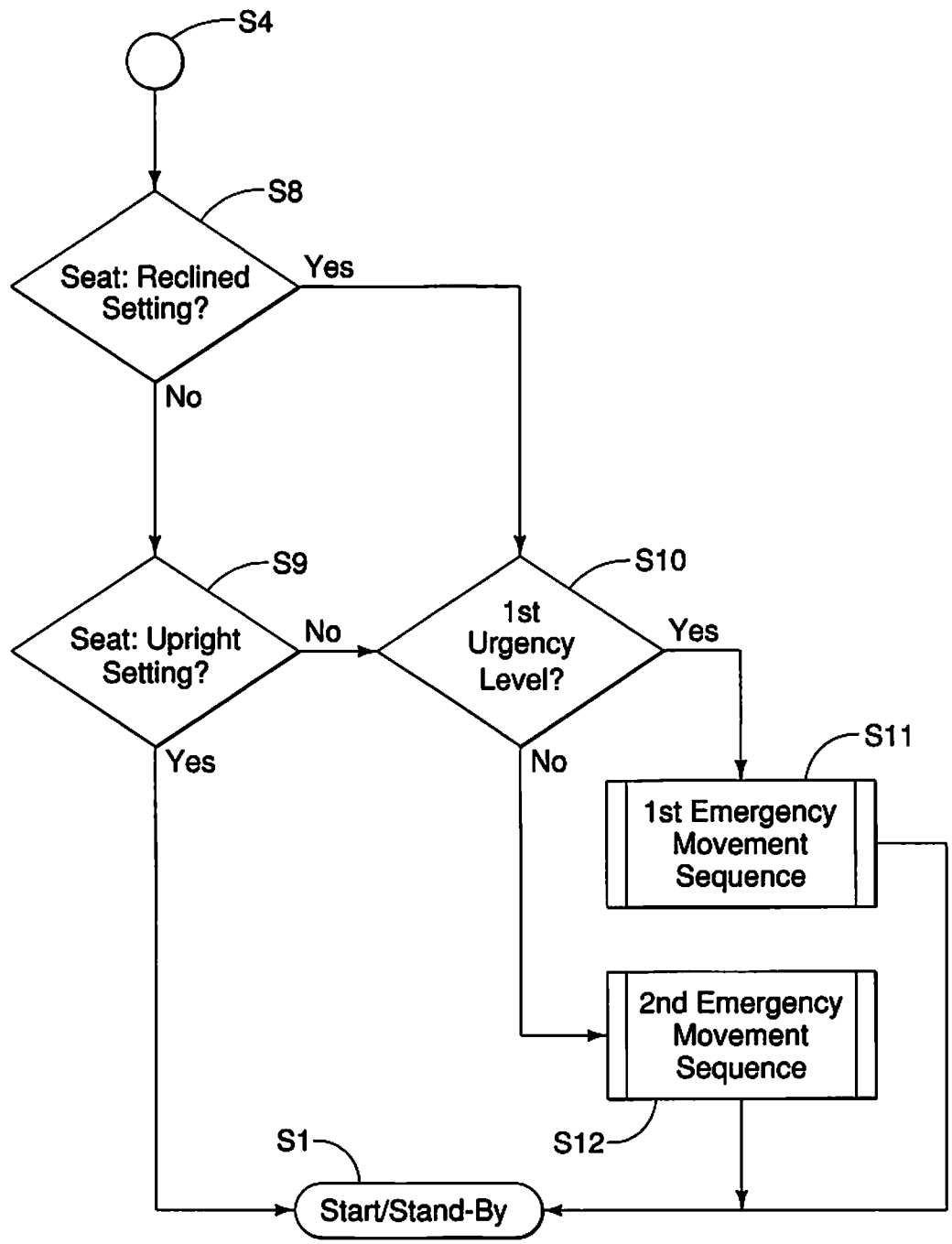
FIG. 16 is a second flowchart showing operational logic conducted by the seat and display controller in accordance with the one embodiment.
Figure 17:
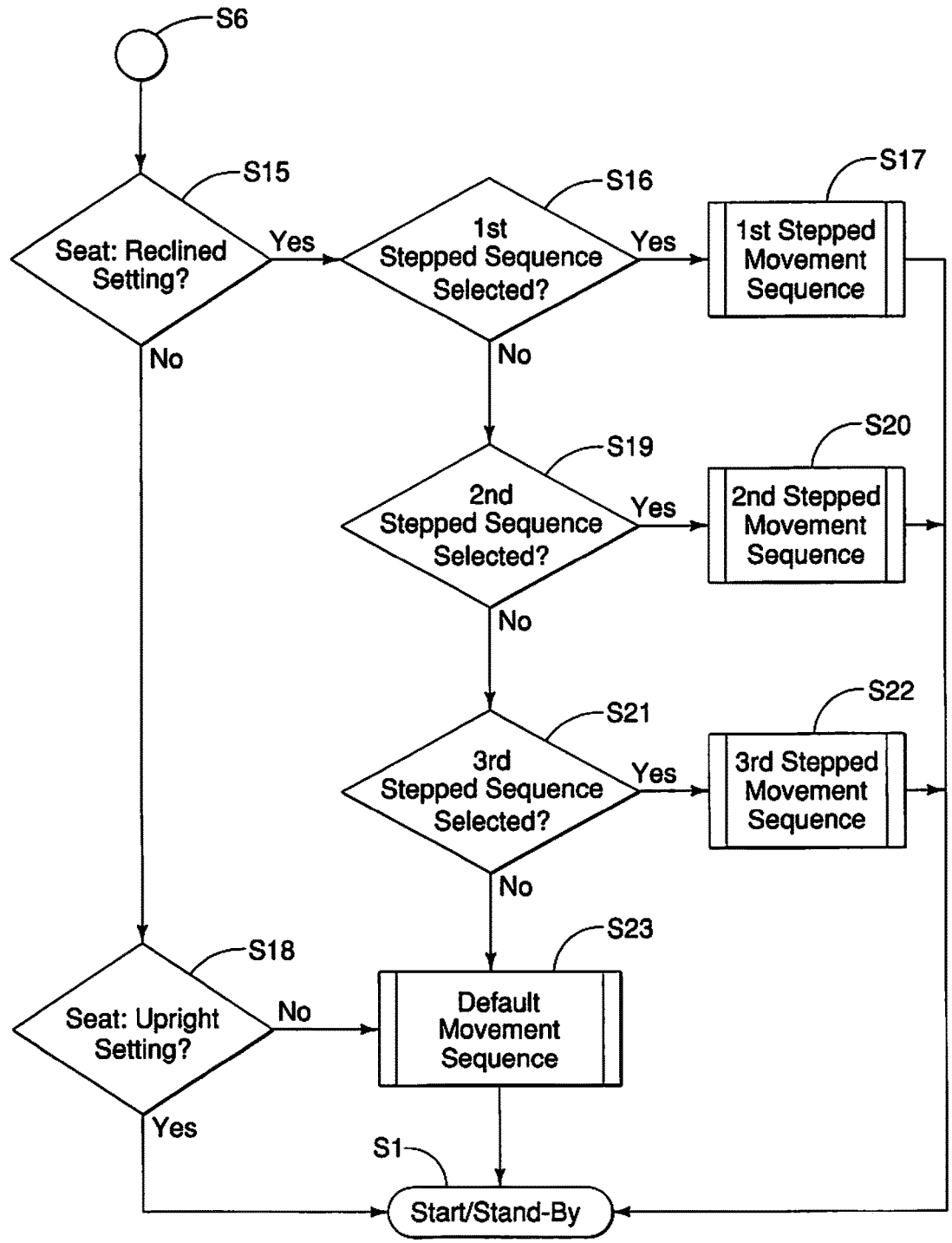
FIG. 17 is a third flowchart showing operational logic conducted by the seat and display controller in accordance with the one embodiment.

A description is now provided with specific reference to FIGS. 15-17 of one example of basic logic that can be used to control the seat controller 66 in cooperation with operations of the autonomous vehicle controller 12.

A basic flowchart is shown in FIG. 15. At a first step, step S1, the seat controller 66 of the seat positioning system 18 monitors various conditions, including the status of the autonomous vehicle controller 12. At step S2, the seat controller 66 determines the status of the autonomous vehicle controller 12. Specifically, if the autonomous vehicle controller 12 is in the self-driving mode (the AV Mode) then operation moves to step S3. If the autonomous vehicle controller 12 is not in the self-driving mode, but rather is in the manual driving mode where the vehicle operator H has control of the vehicle 10, then operation returns to step S1.

At step S3, the seat controller 66 determines whether or not an emergency condition has been detected. If so, then operation moves to step S4. At step S4, operation moves to the logic depicted in FIG. 16, and described further below. If not, then operation moves to step S5.

At step S5, the seat controller 66 determines whether or not a non-emergency condition has been detected, such as the vehicle 10 approaching its destination. If a non-emergency condition has been detected, then operation moves to step S6. At step S6, operation moves to the logic depicted in FIG. 17, and described further below. If not, then operation returns to step S1.

Referring now to FIG. 16, a further example of basic logic used to control the seat controller 66 is depicted. From step S4 in FIG. 15, in FIG. 16 at step S8, the seat controller 66 determines whether or not the operator's seat assembly 42 is in the reclined setting (in a relaxation setting such that the vehicle operator H can watch the display 16 on the ceiling above the vehicle operator H). If the operator's seat assembly 42 is in the reclined setting, then operation moves to step S10. If not, operation moves to step S9. At step S9, the seat controller 66 determines whether or not the operator's seat assembly 42 is in the upright setting ready for the vehicle operator H to resume driving operations in the manual driving mode. At step S9, if the operator's seat assembly 42 is in the upright setting, then operation moves to step S1 and returns to FIG. 15. At step S9, if the operator's seat assembly 42 is not in the upright setting, then operation moves to step S10.

At step S10, the seat controller 66 determines whether or not the autonomous vehicle controller 12 has determined that a first urgency level exists at present. If so, operation moves to step S11. If not, then operation moves to step S12.

At step S11, the seat controller 66 operates the positioning mechanism 56 of the operator's seat assembly 42 and moves the portions of the operator's seat assembly 42 to the upright setting immediately without delay.

At step S12, the seat controller 66 operates the positioning mechanism 56 of the operator's seat assembly 42 and moves the portions of the operator's seat assembly 42 to the upright setting with only a short delay of, for example 30 second, providing the vehicle operator H with some type of alarm or warning signal, such as vibrating the operator's seat assembly 42, providing an audible alarm and/or providing a visual alarm on the display 16. Thereafter, operation returns to FIG. 15.

Referring now to FIG. 17, a further example of basic logic used to control the seat controller 66 is depicted. From step S6 in FIG. 15, in FIG. 17 at step S15, the seat controller 66 determines whether or not the operator's seat assembly 42 is in the reclined setting (in a relaxation setting such that the vehicle operator H can watch the display 16 on the ceiling above the vehicle operator H). If the operator's seat assembly 42 is in the reclined setting, then operation moves to step S16. If not, operation moves to step S18.

At step S16, the seat controller 66 determines whether or not a first stepped movement sequence has been previously selected by the vehicle operation H. If the first stepped movement sequence has been selected, then operation moves to step S17. If not, operation moves to step S19. The first stepped movement sequence can be, for example, the movement sequence described above with reference to FIGS. 7-9. At step S17, the first stepped movement sequence is performed by the seat controller 66 in a manner consistent with the description of FIGS. 7-9, as described above.

At step S19, the seat controller 66 determines whether or not a second stepped movement sequence has been previously selected by the vehicle operation H. If the second stepped movement sequence has been selected, then operation moves to step S20. If not, operation moves to step S21. At step S20, the second stepped movement sequence is performed by the seat controller 66. The second stepped movement sequence can be, for example, the three-step movement sequence described above.

At step S21, the seat controller 66 determines whether or not a third stepped movement sequence has been previously selected by the vehicle operation H. If the third stepped movement sequence has been selected, then operation moves to step S22. If not, operation moves to step S23. The third stepped movement sequence can be, for example, the four-step movement sequence described above with reference to FIGS. 10-14. At step S22, a movement sequence is performed by the seat controller 66 in a manner consistent with the description of FIGS. 10-14, as described above.

Returning now to step S18, the seat controller 66 determines whether or not the vehicle operator's seat 42 is currently in the upright setting. If so, operation moves to step SI and FIG. 15. If not, then operation moves to step S23. At step S23, the operator's seat assembly 42 is moved from its current position to the upright setting using a default movement sequence that can be any of the three movement sequences described above, or can be a slow, staggered movement to the upright settings.

Steps S18 and S23 take into account a situation where the vehicle operator H has moved the operator's seat assembly 42 to a horizontal position and an angular orientation that corresponds to neither the reclined setting or the upright setting. Therefore, regardless of the orientation and settings of the operator's seat assembly 42, the seat controller 66 can return it to the upright setting when necessary in order to allow the autonomous vehicle controller 12 to switch smoothly from the self-driving mode to the manual driving mode.

U.S. patent application Ser. No. 15/383,565 (incorporated herein by reference in its entirety) discloses further operational features and functions of the display 16 effected by the seat controller 66.

It should be understood from the drawings and the description herein, that the autonomous vehicle controller 12 and the seat controller 66 can be the same electronic controller, or can be several different controllers, each configured to conduct prescribed operations. Further, the optimal display location of the display 16 as determined by the seat controller 66 in step S31 can be overridden and ignored when multiple passengers are present within the vehicle 10. For example, if there are passengers in the rear seat, then the seat controller 66 can display images and/or video to the display location Ps shown in FIG. 17, where most if not all of the display area of the display is utilized to show the images and/or video the current driver and passengers. Thus, even though the vehicle operator (driver) has entered a specific display location in his or her reclined settings, the seat controller 12 can override that particular setting in favor of providing displaying of video or image for all passengers within the vehicle 10.

It should also be understood from the drawings and the description herein that the data input, positioning and setting functions of the control panel 60 can also be duplicated elsewhere in the vehicle 10. For example, the seat positioning and seatback orientation adjustments can be set by a vehicle occupant via a seat control panel (not shown) installed to a portion of the base portion 50 or the seat cushion portion 52. Consequently, a vehicle occupant can override the stored seat positioning and seat orientation settings after being adjusted by the seat controller 66. Further data input can be accomplished via touch screen controls that can be a part of the display 16. Since touch screen controls are conventional display features, further description is omitted for the sake of brevity.

The seat controller 66 (and the autonomous vehicle controller 12) preferably includes a microcomputer with a seat and display control program that controls the autonomous vehicle seat positioning system 18. The seat controller 66 can also include other conventional components such as video player, an image processing and displaying device, an input interface circuit, an output interface circuit, and storage devices such as a ROM (Read Only Memory) device and a RAM (Random Access Memory) device, as well as a video storage device for storing movies, television programs and the like. The microcomputer of the seat controller 66 is programmed to control the autonomous vehicle seat positioning system 18. The memory circuit stores processing results and control programs such as ones for autonomous vehicle seat positioning system operation that are run by the processor circuit. The seat controller 66 is operatively coupled to the various components of the autonomous vehicle seat positioning system 18 in a conventional manner. The internal RAM of the seat controller 66 stores statuses of operational flags and various control data. The internal ROM of the seat controller 66 stores various operational instructions for operating the various components of the autonomous vehicle seat positioning system. The seat controller 66 is capable of selectively controlling any of the components of the autonomous vehicle seat positioning system 18 in accordance with the control program. It will be apparent to those skilled in the art from this disclosure that the precise structure and algorithms for the seat controller 66 can be any combination of hardware and software that will carry out the functions of the present invention.

The various components of the vehicle 10 are conventional components that are well known in the art. Since vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the autonomous vehicle seat positioning system. Accordingly, these terms, as utilized to describe the present invention should be interpreted relative to a vehicle equipped with the autonomous vehicle seat positioning system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An autonomous vehicle seat positioning system, comprising:
   an autonomous vehicle controller configured to operate a vehicle in a self-driving mode and a manual driving mode;
   an operator's seat assembly having a positioning mechanism configured to move the operator's seat assembly between a reclined setting and an upright setting; and
   a seat controller connected to the autonomous vehicle controller and the positioning mechanism of the vehicle seat assembly the seat controller being configured to operating the positioning mechanism such that with the autonomous vehicle controller operating the vehicle in the self-driving mode and the vehicle operator's seat assembly being in the reclined setting:
   in response to the autonomous vehicle controller detecting an emergency condition requiring a change from the self-driving mode to the manual driving mode, the seat controller operates the positioning mechanism to move the operator's seat assembly from the reclined setting to the upright setting in an emergency re-positioning mode,
   in response to the autonomous vehicle controller detecting a non-emergency condition requiring a change from the self-driving mode to the manual driving mode, the seat controller operates the positioning mechanism to move the operator's seat assembly from the reclined setting to the upright setting in a non-emergency re-positioning mode, and
   the autonomous vehicle controller is configured such that the emergency condition includes further determining a first level of urgency and a second level of urgency,
   the seat controller is configured such that the emergency re-positioning mode includes a first emergency movement sequence and a second emergency movement sequence, wherein
   in response to the autonomous vehicle controller determining that the emergency condition includes the first level of urgency, the seat controller employs the first emergency movement sequence in which the seat positioning mechanism is operated to immediately move the operator's seat assembly from the reclined setting to the upright setting, and
   in response to the autonomous vehicle controller determining that the emergency condition includes the second level of urgency, the seat controller employs the second emergency movement sequence in which the seat positioning mechanism is operated to move the operator's seat assembly from the reclined setting to the upright setting within a first pre-determined period of time.

2. The autonomous vehicle seat positioning system according to claim 1, wherein the first pre-determined period of time is between 1 and 2 minutes.

3. The autonomous vehicle seat positioning system according to claim 1 wherein
   the autonomous vehicle controller is configured such that the first level of urgency is determined in response to a first group of detected road conditions that include a road incident that has occurred less than a first predetermined distance ahead of the vehicle, or a weather condition determined to be less that the first predetermined distance ahead of the vehicle, and
   the autonomous vehicle controller is configured such that the second level of urgency is determined in response to a second group of detected road conditions that include a road incident that has occurred greater than the first predetermined distance from the vehicle and less a second predetermined distance from the vehicle, or the vehicle is approaching a weather condition that has been detected a distance ahead of the vehicle greater than the first predetermined distance from the vehicle and less the second predetermined distance from the vehicle.

4. The autonomous vehicle seat positioning system according to claim 1, wherein
   the seat controller is configured such that the non-emergency re-positioning mode includes a non-emergency movement sequence in which the seat controller moves the operator's scat assembly from the reclined setting to the upright setting in a stepped sequence in order to gradually move the occupant of the operator's seat assembly to the upright setting.

5. The autonomous vehicle seat positioning system according to claim 4, wherein
the stepped sequence of the non-emergency re-positioning mode employed by the seat controller includes a two-stage movement such that during a first stage of movement, the operator's seat assembly is moved to an intermediate orientation approximately 50% of the distance between the reclined setting and the upright setting, after which movement is paused for a predetermined number of seconds, and then moved in a second stage of movement to the upright setting.

6. The autonomous vehicle seat positioning system according to claim 4, wherein
the stepped sequence of the non-emergency re-positioning mode employed by the seat controller includes a three-stage movement such that during a first stage of movement, the operator's seat assembly is moved to a first intermediate orientation approximately 33% of the distance from the reclined setting to the upright setting, after which movement is paused for a predetermined number of seconds, and then moved to a second intermediate orientation approximately 66% of the distance from the reclined setting the upright setting, after which movement is paused for the predetermined number of seconds and then moved fully to the upright setting.

7. The autonomous vehicle seat positioning system according to claim 4. wherein
the stepped sequence of the non-emergency re-positioning mode employed by the seat controller includes a four-stage movement such that during a first stage of movement, the operator's seat assembly is moved to a first intermediate orientation approximately 25% of the distance from the reclined setting to the upright setting, after which movement is paused for a predetermined number of seconds, then moved to a second intermediate orientation approximately 50% of the distance from the reclined setting the upright setting, after which movement is paused for the predetermined number of seconds, then moved to a third intermediate orientation approximately 75% of the distance from the reclined setting the upright setting, after which movement is paused for the predetermined number of seconds, and then moved fully to the upright setting.

8. The autonomous vehicle seat positioning system according to claim 1, wherein
the seat controller is configured such that the non-emergency re-positioning mode includes vibrating the operator's seat assembly prior to movement of the operator's seat assembly.

9. The autonomous vehicle seat positioning system according to claim 1, further comprising
a display installed to a roof of a passenger compartment within the vehicle, and
the seat controller is connected to the display and is configured to display information relating to movement of the operator's seat assembly, including a countdown to beginning of movement of the operator's seat assembly in the non-emergency re-positioning mode.

10. The autonomous vehicle seat positioning system according to claim 1, further comprising
a camera configured to capture images of an occupant seated in the operator's seat assembly, the camera being connected to the seat controller, and the seat controller is configured to determine whether or not the occupant of the operator's seat assembly is currently asleep.

11. An autonomous vehicle seat positioning, system, comprising
an autonomous vehicle controller configured to operate a vehicle in a self-driving mode and a manual driving mode:
an operator's seat assembly having a positioning mechanism configured to move the operator's seat assembly between a reclined setting and an upright setting:
a display installed to a roof of a passenger compartment within the vehicle: and
a seat controller connected to the autonomous vehicle controller and the positioning mechanism of the vehicle seat assembly, the seat controller being configured to operating the positioning mechanism such that with the autonomous vehicle controller operating the vehicle in the self-driving mode and the vehicle operator's seat assembly being in the reclined setting:
in response to the autonomous vehicle controller detecting an emergency condition requiring a change to the manual driving mode, the seat controller operates the positioning mechanism to move the operator's seat assembly from the reclined setting to the upright setting in an emergency re-positioning mode, and
in response to the autonomous vehicle controller detecting a non-emergency condition requiring a change to the manual driving mode, the seat controller operates the positioning mechanism to move the operator's seat assembly from the reclined setting to the upright setting in a non-emergency re-positioning mode,
the autonomous vehicle controller being configured such that the non-emergency condition includes one of the following: a determination that the vehicle will arrive at a designated destination within a second predetermined period of time, and a determination that the vehicle is in need of re-fueling within the second predetermined period of time.

12. An autonomous vehicle seat positioning system, comprising
an autonomous vehicle controller configured to operate a vehicle in a self-driving mode and a manual driving mode:
an operator's seat assembly having a positioning mechanism configured to move the operator's seat assembly between a reclined setting and an upright setting:
a display installed to a roof of a passenger compartment within the vehicle: and
a seat controller connected to the autonomous vehicle controller and the positioning mechanism of the vehicle seat assembly. the seat controller being configured to operating the positioning mechanism such that with the autonomous vehicle controller operating the vehicle in the self-driving mode and the vehicle operator's seat assembly being in the reclined setting:
in response to the autonomous vehicle controller detecting an emergency condition requiring a change to the manual driving mode, the seat controller operates the positioning mechanism to move the operator's seat assembly from the reclined setting to the upright setting in an emergency re-positioning mode, and
in response to the autonomous vehicle controller detecting a non-emergency condition requiring a change to the manual driving mode, the seat controller operates the positioning mechanism to move the operator's seat assembly from the reclined setting to the upright setting in a non-emergency re-positioning mode.

13. The autonomous vehicle seat positioning system according to claim 12, wherein
the seat controller is connected to the display and is configured to display information on the display including captured images of an area forward of the vehicle with the operator's seat assembly in the reclined setting.

14. The autonomous vehicle seat positioning system according to claim 12, wherein
the operator's seat assembly has a base portion, a seat cushion portion and a seatback portion, the base portion being attached to a floor of a passenger compartment within the vehicle, the seat cushion portion being directly supported to the base portion and being movable relative to the base portion, the seatback portion supported for pivotal movement relative to the seat cushion portion, and the positioning mechanism being configured to move the seat cushion portion in vehicle forward and vehicle rearward directions to any of a plurality of positions relative to the base portion and being configured to move the seatback portion to any of a plurality of upright orientations and a plurality of reclined orientations relative to the seat cushion portion; and
the seat controller is configured such that
a first of the plurality of positions of the seat cushion portion and a first of the plurality of scat upright orientations of the seatback portion inputted by the first occupant via a control panel are saved in memory as the first upright setting by the seat controller, the first upright setting corresponding to the first occupant being positioned for manual driving of the vehicle with the autonomous vehicle controller operating the vehicle in the manual driving mode, and
a second of the plurality of positions of the, seat cushion portion and a first of the plurality of seat reclined orientations of the seatback portion inputted by the first occupant via the control panel, are saved by the seat controller as the reclined setting, the reclined setting corresponding to the first occupant being positioned for viewing the display with the vehicle operating in the self-driving mode.

15. The autonomous vehicle seat positioning system according to claim 13, wherein
the seat controller is configured to determine how long the occupant has been asleep, and in response to determining that the occupant has been sleeping for longer than a third predetermined period of time, the seat controller vibrates the operator's seat assembly.

* * * * *